United States Patent [19]

Kaji et al.

[11] 4,326,040
[45] Apr. 20, 1982

[54] REFRACTORY FOR CASTING AND PROCESS FOR PRODUCING SAME

[76] Inventors: Nobuhiko Kaji, 2-2-8, Yugawa Kokura Minami-ku Kita Kyushu-shi, Fukuoka-ken; Hidenobu Honda, 2-11-36, Higashi Narumizu, Yahata Nishi-ku, Kita Kyushu-shi, Fukuoka-ken; Hiroshi Shikano, 4-9-40, Kobai, Yahata Nishi-ku, Kita Kyushu-shi, Fukuoka-ken, all of Japan

[21] Appl. No.: 220,468

[22] Filed: Dec. 24, 1980

[30] Foreign Application Priority Data

Dec. 28, 1979 [JP] Japan .................................. 54-170307

[51] Int. Cl.$^3$ .............................................. C04B 35/52
[52] U.S. Cl. ..................................... 501/100; 501/105
[58] Field of Search ...................... 106/56, 57; 501/99, 501/100, 105

[56] References Cited

U.S. PATENT DOCUMENTS

| | | | |
|---|---|---|---|
| 3,752,372 | 8/1973 | Mitchell | 106/56 |
| 4,059,662 | 11/1977 | Murakami et al. | 106/56 |
| 4,066,467 | 1/1978 | Rechter | 106/56 |

*Primary Examiner*—James Poer
*Attorney, Agent, or Firm*—Armstrong, Nikaido, Marmelstein & Kubovcik

[57] ABSTRACT

A refractory for steel casting comprising, based on the total weight of the refractory in each case, 5–80% by weight of ZRM, 10–40% by weight of carbon powder, 0–20% by weight of one or more of SiC, $Si_3N_4$, metallic silicon and ferrosilicon, 0–30% by weight of fused silica and 0–60% by weight of alumina powder containing at least 70% by weight of $Al_2O_3$ based on the total weight of the alumina powder. The ZRM includes the main mineral phase consisting of mullite, baddeleyite and corundum and having the chemical composition consisting of 25–85% by weight of $Al_2O_3$, 10–70% by weight of $ZrO_2$ and 5–25% by weight of $SiO_2$. A process for producing the refractory for steel casting.

10 Claims, No Drawings

REFRACTORY FOR CASTING AND PROCESS FOR PRODUCING SAME

BACKGROUND OF THE INVENTION

This invention relates to a highly durable carbon powder-containing refractory for steel casting and more particularly, to a highly durable carbon-containing refractory nozzle system of a casting machine and a process for producing such a refractory nozzle system.

Of late, with the aim to increase the yield rate and reduce the cost in the production of steel castings, the so-called continuous charge casting system has been increasingly employed in place of the so-called batch charge system and particularly, in these last years the steel casting operation has been in most cases consecutively performed from several charges up to several ten charges.

In a steel casting machine, the refractory nozzle is employed between the ladle tundish and between the tundish and mould, respectively and serves to prevent oxidation of molten steel and regulate the flow direction of the molten steel. Thus, the refractory nozzle is a quite important refractory component in the steel casting machine.

However, when the refractory nozzle is employed in the continuous casting operation referred to hereinabove, since the nozzle tends to be submerged in the molten steel pool for a fairly long time period, the portion of the nozzle which is designed to come to contact with a highly erosive powder layer such as silica or alumina which is spread over the top of the molten steel pool is attacked by the erosive powder.

In order to protect the particular portion of the refractory nozzle from the erosive material, various attempts have been made up to date. The conventional attempts are (1) the formation of the nozzle with $Al_2O_3$ and graphite, (2) the mounting of a protective ring on the powder contacting portion of the nozzle brick and (3) the simultaneous formation of the powder contacting portion and the rest of the refractory nozzle by the use of a high erosion resistance material (for example, zirconia or the like) and steel, respectively, to thereby reinforce the refractory nozzle powder contacting portion. However, none of these conventional attempts have been found perfectly satisfactory. Although the attempt (3) has been extensively studied and widely practiced because the attempt can use the expensive material such as zirconia with a high efficiency, since the nozzle is formed of a combination of different materials, this nozzle encounters difficulty in the formation of the same. In addition, the powder contacting portion of the nozzle formed of the different material combination can not be always maintained in contact with the powder layer over the molten steel pool because the refractory nozzle moves upwardly and downwardly in the casting operation to thereby render some portion of the refractory nozzle other than the powder contacting portion thereof to be exposed to the erosive powder layer which may result in giving damage to the area adjacent to the powder contacting portion of the nozzle and thus, the attempt has been found not perfectly satisfactory.

When a long nozzle the tip of which is adapted to be always submerged in the molten steel pool during the casting operation is employed, the submerged tip of the nozzle is attached by the heat of the molten steel flowing down through the refractory nozzle and wears off prematurely to thereby reduce the designed service life of the nozzle. Furthermore, when a submerged nozzle is used, alumina deposit from the molten steel tends to adhere to the orifices in the nozzle to clog up them which may also reduce the service life of the nozzle.

In order to prevent the nozzle orifices from being clogged up by the alumina deposit from the molten steel, it has been proposed to blow gas such as argon gas into the orifices. However, in the conventional refractory nozzle formed of a combination of $Al_2O_3$ and graphite, the alumina deposit cannot be perfectly removed from the orifices and such gas blowing has been found not fully effective. And the gas blowing tends to disturb the molten steel pool to thereby accelerate the wearing-off of the refractory nozzle. The wearing-off progresses from the walls of the refractory nozzle orifices into the body of the nozzle.

Thus, there has been a demand for a nozzle for use in the continuous steel casting operation which can effectively solve the problem of orifice clogging-up by alumina deposit without the blowing of gas or by full realization of the effects of gas blowing and that of wearing-off of the nozzle.

A patent has been granted to the formation of a highly durable nozzle for the continuous steel casting operation with a combination of $Al_2O_3$ and graphite with zircon or zirconia added thereto. However, since zircon or zirconia is employed in its original form, such additive cannot be perfectly and uniformly distributed within the $Al_2O_3$ and graphite combination. In addition, since zircon and zirconia have a higher fire resistance than those of the other components of the refractory nozzle, such additive materials take a rather long time period until they form a highly viscous glass film through their reaction with the other refractory nozzle components and the other components tend to be adversely affected by the heat of molten steel before the glass film is formed.

And in order to prevent the refractory nozzle orifice clogging-up problem, although it has been proposed to add silica in an increased amount to the $Al_2O_3$ and graphite combination, the addition of such increased amount of silica is still not able to appreciably reduce the possibility of refractory nozzle orifice clogging-off. And it is difficult to increase the amount of the additive in proportion to the amount of alumina deposit to prevent wearing-off and orifice clogging-up whereby the additive cannot be added in an amount to cope with variation in the type of steel material to be cast.

SUMMARY OF THE INVENTION

Therefore, the purpose of the present invention is to provide a novel and improved highly durable refractory for nozzles for use in continuous steel casting which can effectively eliminate the disadvantages inherent in the conventional refractory nozzle and be continuously employed for a long time period and a process for producing the refractory.

The inventors have previously developed a highly durable refractory nozzle for use in the continuous steel casting based on the discovery that a refractory nozzle formed of an electrically fused or burnt refractory material clinker comprising a refractory component including the principal mineral phase consisting of mullite, baddeleyite and corundum and having the chemical composition consisting of $Al_2O_3$, $ZrO_2$ and $SiO_2$ within a certain blending ratio (the refractory material clinker will be referred to as "ZRM" hereinafter) and the refractory nozzle is the subject of Japanese patent application No. 87459/1979. As disclosed in this Japanese patent application, the highly durable refractory nozzle for use in the continuous steel casting is prepared by admixing, based on the total weight of the refractory in each case, refractory component including the principal mineral phase consisting of mullite, baddeleyite and corundum and having the chemical composition consisting of 30–60% by weight of $Al_2O_3$, 20–60% by weight of $ZrO_2$ and 5–25% by weight of $SiO_2$ based on the weight of the chemical composition, respectively, 20–40% by weight of graphite powder, 0–10% by weight of SiC, 0–25% by weight of fused silica and 0–45% by weight of alumina powder containing at least 70% by weight of $Al_2O_3$ based on the weight of the alumina powder at cold temperature or under heating by the use of resin or pitch binder, moulding the mixture and burning the moulded product in non-oxidation atmosphere.

However, through subsequent researches, the inventors have found that the ZRM nozzle positively forms highly viscous glass films thereon with the heat from molten steel to thereby improve the heat resistance of the inner and outer surfaces of the nozzle, that the presence of the thus formed glass films on the inner and outer surfaces of the refractory nozzle improve wear resistance and anti-orifice clogging-off of the refractory nozzle and that the nozzle is imparted thereto a high durability even when the blending ratio of the components in the refractory component and the blending amount of the refractory component in the refractory are varied within a certain range and particularly, even when the refractory component is employed in the mixture in amounts ranging from 5–30% by weight based on the total weight of the mixture, the highly durable nozzle for casting to which the present invention is directed can be employed.

PREFERRED EMBODIMENTS OF THE INVENTION

According to the present invention, a highly durable refractory nozzle for use in the continuous steel casting can be provided by admixing, based on the total weight of the mixture in each case, 5–80% by weight of refractory component including the principal mineral phase consisting of mullite, baddeleyite and corundum and having the chemical composition consisting of 25–85% by weight of $Al_2O_3$, 10–70% by weight of $ZrO_2$ and 5–25% by weight of $SiO_2$, respectively, based on the total weight of the chemical composition, 10–40% by weight of graphite powder, 0–20% by weight of one or more members selected from SiC, $Si_3N_4$, metallic silicon and ferrosilicon, 0–30% by weight of fused silica and 0–60% by weight of alumina powder containing at least 70% by weight of $Al_2O_3$ based on the total weight of the alumina powder at cold temperature or under heating by the use of resin or pitch binder, moulding the mixture and burning the moulded mixture in non-oxidation atmosphere.

As to the refractory component including the principal mineral phase consisting of mullite, baddeleyite and corundum and having the chemical composition consisting of 25–85% by weight of $Al_2O_3$, 10–70% by weight of $ZrO_2$ and 5–25% by weight of $SiO_2$ based on the total weight of the chemical composition, clinker prepared by fusing zircon and alumina as principal materials or clinker prepared by fusing zircon and alumina with the addition of baddeleyite thereto can be employed. The present invention is not limited to the use of ZRMs prepared by fusing zircon and alumina with or without the addition of baddeleyite thereto, but clinkers prepared by sintering zircon and alumina with or without the addition of baddeleyite thereto and grinding the sinter to adjust the grain size thereof can be also employed.

Zirconia has an excellent erosion resistance and as mentioned hereinabove, although zirconia is suitably employed to reinforce the powder contacting portion of the refractory nozzle, the material is prohivitively expensive. In addition, since zirconia has a relatively high specific gravity and as a result, the erosion resistance material adds weight to the resulting refractory nozzle to thereby make it inconvenient to handle the refractory nozzle. On the other hand, stabilized zirconia has a higher coefficient of thermal expansion than those of oxides such as corundum and zircon which are employed as the principal components of a carbon-containing submerged nozzle. Unstabilized zirconia tends to expand excessively to the extent that the material cracks.

With the aim to provide a nozzle for use in steel casting which has spalling, wear and orifice clogging-up resistance properties and which can form a glass film easily while retaining excellent erosion resistance against the erosive powder layer, the inventors have conducted extensive researches on various materials and have found that in ZRM zirconia crystals deposit within and about mullite and corundum crystals to protect the mullite and corundum crystals and the zirconia crystals exhibit excellent erosion resistance effect. And since ZRM has a relatively lower resistance as compared with alumina, zirconia and zircon, ZRM can easily form a glass film in which zirconia is dispersed and has a high viscosity. Furthermore, ZRM has a relatively low coefficient of thermal expansion such as $7 \times 10^{-6}$ and is characterized by its low coefficient of thermal expansion such as $2-4 \times 10^{-6}$ within the high temperature range of 1000°–1600° C. The inventors have come to the conclusion that these properties of ZRM make ZRM suitable as the principal refractory component for submerged nozzles for use in continuous steel casting which is required to have high erosion, wear, orifice clogging-up and spalling resistance properties.

When ZRM contains $ZrO_2$ in amounts less than 10% by weight based on the total weight of ZRM, the amount of zirconia which deposits within and about mullite and corundum crystals is insufficiently small and $ZrO_2$ in such small amounts fails to improve the erosion resistance of the nozzle. On the other hand, when the amount of $ZrO_2$ exceeds 70% by weight, since the $ZrO_2$ is present in the form of monoclinic crystals, any abnormal expansion occurs in $ZrO_2$ to thereby undesirably reduce the spalling resistance of the nozzle. Thus, the amount of $ZrO_2$ to be contained in ZRM should be within the range of 10–70% by weight based on the total weight of ZRM.

And in ZRM the amounts of $Al_2O_3$ and $SiO_2$ should be within the ranges of 25–89% by weight and 5–25% by weight, respectively, based on the total weight of ZRM.

ZRM having the above-mentioned chemical composition occupies 5–80% by weight based on the total weight of the mixture for the refractory nozzle. When ZRM is employed in amounts less than 5% by weight in the mixture, the above-mentioned properties of ZRM cannot exhibit their full effects and on the other hand, when the amount of ZRM exceeds 80% by weight, the spalling resistance property of the resulting submerged nozzle is insufficient.

The amount of graphite in the mixture should be within the range of 10-40% by weight based on the total weight of the mixture. When graphite is employed in amounts less than 10% by weight, the resulting nozzle has insufficient erosion and spalling resistances. On the other hand, when the amount of graphite exceeds 40% by weight, graphite melts into the molten steel pool and presents as impurity in the molten steel. In place of graphite, amorphous graphite, acheson graphite, kish graphite, thermally decomposed graphite, petroleum pitch coke, coal coke, anthracite, charcoal, carbon black, thermally decomposed carbon of carbonhydride, thermally decomposed carbon of carbon hydrate, thermally decomposed carbon of synthetic resin or glassy carbon can be equally employed within the scope of the invention.

The amount of one or more members selected from the group consisting of SiC, $Si_3N_4$, Metallic silicon and ferrosilicon should be within the range of 0-20% by weight and the one or members of the group form a $SiO_2$ glass film when they oxidize. The glass film contributes to the prevention of oxidation. When the amount of the one or more members of the group exceeds 20% by weight, the material or materials melt into the molten steel pool and present as impurity or impurities in the molten metal. The amount of fused silica should be within the range of 0-30% by weight based on the total weight of the mixture and the fused silica in amounts within the range serve to impart spalling and orifice clogging-up resistance properties to the resulting nozzle. When silica is employed in amounts in excess of 30% by weight, the nozzle tends to be damaged by the molten metal.

The amount of alumina containing up to 70% by weight of $Al_2O_3$ based on the total weight of the alumina should be within the range of 0-60% by weight based on the total weight of the refractory mixture. However, since $Al_2O_3$ is also contained in ZRM, alumina is added to the refractory mixture as the case may be.

According to the present invention, the above-mentioned components of the refractory mixture are mixed together by the use of resin or pitch binder at cold temperature or under heating, the resulting refractory mixture is moulded and the moulded product is burnt in non-oxidation environment.

Examples of the present invention will be given hereinbelow by way of illustration together with controls for comparison purpose, but not for limiting the present invention thereto.

Table 1 shows properties of various ZRMs employed as the principal components in the production of refractory mixtures for nozzles for use in continuous steel casting and Tables 2 and 3 show various blending ratios of ZRMs and other components together with properties of refractory mixtures obtained. In each case, the mixing was carried out by the use of an airich mixer, the moulding was carried out by the use of a rubber press under the pressure of 1200 kg/cm² and the burning was carried out by the conventional practice with the moulded product embedded in coke. It has been found that nozzles formed of the refractory mixtures containing ZRMs exhibited excellent orifice clogging-up, wear and spalling resistance properties and also erosion resistance property against erosive powder layer. No cracks occurred in the powder contacting portions of the nozzles and the obtained nozzles are superior to the conventional comparative nozzles.

TABLE 1

| | Chemical Composition By weight (%) | | | Properties of ZRM Physical Property | | Coefficient of Thermal Expansion (%) | |
|---|---|---|---|---|---|---|---|
| No. | $ZrO_2$ | $Al_2O_3$ | $SiO_2$ | Bulk Specific Gravity | Apparent Porosity (%) | At 1000° C. | Abnormality |
| ZRM 1 | 10.0 | 67.0 | 18.0 | 3.05 | 4.0 | 0.65 | none |
| ZRM 2 | 35.0 | 63.0 | 16.0 | 3.15 | 4.1 | 0.65 | " |
| ZRM 3 | 35.0 | 48.0 | 16.0 | 3.65 | 2.5 | 0.70 | slight |
| ZRM 4 | 45.0 | 40.0 | 14.0 | 3.80 | 2.9 | 0.80 | " |
| ZRM 5 | 55.0 | 33.0 | 10.0 | 3.95 | 2.7 | 0.70 | " |
| ZRM 6 | 70.0 | 20.0 | 10.0 | 4.20 | 3.1 | 0.70 | medium |
| ZRM 7 | 80.0 | 13.0 | 5.0 | 4.35 | 3.8 | 0.75 | great |

TABLE 2-A

| | Control 1 | Example 1 | Example 2 | Example 3 | Example 4 | Example 5 | (By weight %) Example 6 |
|---|---|---|---|---|---|---|---|
| Crystalline flaky graphite | 30 | 30 | 30 | 30 | 30 | 30 | 30 |
| ZRM | | 5 (ZRM 3) | 15 (ZRM 4) | 30 (ZRM 4) | 30 (ZRM 4) | 30 (ZRM 4) | 60 (ZRM 4) |
| Electrically fused alumina | 60 | 50 | 40 | 30 | 15 | 10 | |
| Fused silica | | 5 | 5 | | 15 | 20 | |
| Silicon carbide | 5 | 5 | 5 | 5 | 5 | 5 | 5 |
| Metallic silicon | 5 | 5 | 5 | 5 | 5 | 5 | 5 |
| Phenol resin binder | +10 | +10 | +10 | +10 | +10 | +10 | +9.5 |
| Bulk specific gravity | 2.48 | 2.43 | 2.45 | 2.65 | 2.51 | 2.40 | 2.59 |
| Apparent porosity (%) | 18.0 | 18.5 | 18.8 | 18.7 | 18.3 | 19.3 | 20.1 |
| Crushing strength(kg/cm²) | 350 | 280 | 290 | 315 | 300 | 280 | 310 |
| Spalling resistance (1500° C. × 15 minute water cooling, repeated 4 times) | cracks occurred at 3rd water cooling | none | none | none | none | none | no crack |

TABLE 2-A-continued

|  | Control 1 | Example 1 | Example 2 | Example 3 | Example 4 | Example 5 | (By weight %) Example 6 |
|---|---|---|---|---|---|---|---|
| Corrosion resistance index | 100 | 93 | 90 | 77 | 95 | 100 | 55 |
| Number of charges with tundish for 200 ladle | 3 charges | 5 charges | 5 charges | 5 charges | 5 charges | 5 charges | 6 charges |
| Number of charges with tundish for 50 ladle | 1 charge | 1 charge | 1 charge | — | — | — | — |

TABLE 2-B

|  | Example 7 | Example 8 | Example 9 | Example 10 | Example 11 | (By weight %) Example 12 |
|---|---|---|---|---|---|---|
| Crystalline flaky graphite | 30 | 30 | 20 | 30 | 25 | 20 |
| ZRM | 60 (ZRM 5) | 60 (ZRM 3) | 60 (ZRM 4) | 60 (ZRM 6) | 70 (ZRM 3) | 80 (ZRM 3) |
| Electrically fused alumina |  |  |  |  |  |  |
| Fused silica |  |  | 10 |  |  |  |
| Silicon carbide | 5 | 5 | 5 | 5 |  |  |
| Metallic silicon | 5 | 5 | 5 | 5 | 5 |  |
| Phenol resin binder | +9.5 | +9.5 | +9 | +9.5 | +9 | +9 |
| Bulk specific gravity | 2.69 | 2.57 | 2.72 | 2.71 | 2.74 | 2.76 |
| Apparent porosity (%) | 19.7 | 18.8 | 18.4 | 19.1 | 19.6 | 20.0 |
| Crushing strength(kg/cm²) | 320 | 280 | 305 | 275 | 280 | 280 |
| Spalling resistance (1500° C. × 15 minute water cooling, repeated 4 times) | no crack | no crack | no crack | fine cracks occurred at 4th water cooling | fine cracks occurred at 4th water cooling | no crack |
| Corrosion resistance index | 45 | 70 | 55 | 45 | 40 | 35 |
| Number of charges with tundish for 200 ladle | 6 charges | 6 charges | — | — | — | — |
| Number of charges with tundish for 50 ladle | — | — | 2 charges | 2 charges | 2 charges | 2 charges |

TABLE 2-C

|  | Control 2 | Control 3 | Control 4 | Control 5 | Control 6 | (By weight %) Control 7 |
|---|---|---|---|---|---|---|
| Crystalline flaky graphite | 30 | 20 | 30 | 30 | 30 | 30 |
| ZRM | 60 (zirconia) | 70 (zirconia) | 40 (zirconia) | 30 (zircon) | 60 (zircon) | 20 (zirconia) (zircon) 20 |
| Electrically fused alumina |  |  | 20 | 30 |  | 20 |
| Fused silica |  |  |  |  |  |  |
| Silicon carbide | 5 | 5 | 5 | 5 | 5 | 5 |
| Metallic silicon | 5 | 5 | 5 | 5 | 5 | 5 |
| Phenol resin binder | +8.5 | +8 | +9.5 | +10 | +10 | +9.5 |
| Bulk specific gravity | 2.70 | 3.15 | 2.64 | 2.53 | 2.62 | 2.66 |
| Apparent porosity (%) | 20.3 | 19.7 | 20.1 | 18.3 | 18.5 | 17.9 |
| Crushing strength(kg/cm²) | 250 | 330 | 260 | 280 | 330 | 290 |
| Spalling resistance (1500° C. × 15 minute water cooling, repeated 4 times) | cracks occurred at 2nd water cooling | cracks occurred at 1st water cooling | cracks occurred at 2nd water cooling | no crack | no crack | cracks occurred at 3rd water cooling |
| Corrosion resistance index | 40 | 30 | 70 | 105 | 90 | 85 |
| Number of charges with tundish for 200 ladle | 4 charges, cracks occurred | — | 4 charges | 3 charges | — | 3 charges |
| Number of charges with tundish for 50 ladle | 1 charge | — | — | — | 1 charge | — |

TABLE 3

|  | Example 13 | Example 14 long nozzle | Example 15 submerged nozzle | Example 16 submerged nozzle | Control 8 long nozzle | Control 9 submerged nozzle | (by weight %) Control 10 submerged nozzle |
|---|---|---|---|---|---|---|---|
| Crystalline flaky graphite | 30 | 30 | 30 | 30 | 30 | 30 | 30 |
| ZRM | 5 (ZRM 3) | 10 (ZRM 3) | 25 (ZRM 3) | 20 (ZRM 3) | — | — | — |
| Electrically fused alumina | 40 | 35 | 22 | 35 | 45 | 47 | 55 |
| Fused silica | 20 | 20 | 15 | 5 | 20 | 15 | 5 |
| Silicon carbide | 5 | 5 | 5 | 5 | 5 | 5 | 5 |

TABLE 3-continued (by weight %)

| | Example 13 | Example 14 long nozzle | Example 15 submerged nozzle | Example 16 submerged nozzle | Control 8 long nozzle | Control 9 submerged nozzle | Control 10 submerged nozzle |
|---|---|---|---|---|---|---|---|
| Metallic silicon | — | — | 3 | 5 | — | 3 | 5 |
| Phenol resin binder | +10 | +10 | +10 | +10 | +10 | +10 | +10 |
| Bulk specific gravity | 2.25 | 2.25 | 2.30 | 2.40 | 2.25 | 2.30 | 2.40 |
| Apparent porosity (%) | 14.5 | 14.5 | 16.5 | 17.0 | 14.5 | 17.0 | 17.5 |
| Crushing strength(kg/cm$^2$) | 270 | 290 | 240 | 270 | 255 | 245 | 280 |
| Spalling resistance (water cooling for 15 min. at 1500° C., repeated 4 times) | no crack | no crack | no crack | no crack | no crack | no crack | no crack |
| Number of charges with 200 ladle | 11 charges | 13 charges | — | — | 6 charges | — | — |
| Number of charges with tundish for 200 ladle | — | — | 4 charges*[1] no trouble | 6 charges*[2] | — | 2 charges*[1] orifice clogging-off | 5 charges*[2] substantial damage by heat |

Note:
*[1] = high aluminum steel, gas bubbling and laminated layers of zirconia and graphite
*[2] = medium aluminum steel, gas bubbling and laminated layers of zirconia and graphite

What is claimed is:

1. A highly durable refractory for casting comprising, based on the total weight of said refractory in each case, 5–80% by weight of refractory component including the principal mineral phase consisting of mullite, baddeleyite and corundum and having the chemical composition consisting of 25–85% by weight of $Al_2O_3$, 10–70% by weight of $ZrO_2$ and 5–25% by weight of $SiO_2$, respectively, based on the total weight of said chemical composition and 10–40% by weight of carbon powder.

2. The highly durable refractory for casting as set forth in claim 1, further comprising, based on the total weight of said refractory in each case, up to 20% by weight of one or more members selected from the group consisting of SiC, $Si_3N_4$, metallic silicon and ferrosilicon, up to 30% by weight of fused silica and up to 60% by weight of alumina powder containing at least 70% by weight of $Al_2O_3$ based on the total weight of said alumina powder.

3. A process for producing a highly durable refractory for casting comprising the steps of admixing, based on the total weight of said refractory in each case, 5–80% by weight of refractory component including the principal mineral phase consisting of mullite, baddeleyite and corundum and having the chemical composition consisting of 25–85% by weight of $Al_2O_3$, 10–70% by weight of $ZrO_2$ and 5–25% by weight of $SiO_2$, respectively, based on the total weight of said chemical composition and 10–40% by weight of carbon powder by the use of a binder, moulding said mixture and burning the resulting moulded product in non-oxidation environment.

4. A process for producing a highly durable refractory for casting comprising the steps of admixing, based on the total weight of said refractory in each case, 5–80% by weight of refractory component including the principal mineral phase consisting of mullite, baddeleyite and corundum and having the chemical composition consisting of 25–85% by weight of $Al_2O_3$, 10–70% by weight of $ZrO_2$ and 5–25% by weight of $SiO_2$, respectively, based on the total weight of said chemical composition, 10–40% by weight of carbon powder, up to 20% by weight of one or more members selected from the group consisting of SiC, $Si_3N_4$, metallic silicon and ferrosilicon, up to 30% by weight of fused silica and up to 60% by weight of alumina powder containing at least 70% by weight of $Al_2O_3$ based on the total weight of said alumina powder by the use of a binder, moulding said mixture and burning the resulting moulded product in non-oxidation environment.

5. The process as set forth in claim 3 or 4, in which said binder is resin.

6. The process as set forth in claim 3 or 4, in which said binder is pitch.

7. The process as set forth in claim 3 or 4, in which said admixing step is performed at cold temperature.

8. The process as set forth in claim 3 or 4, in which said admixing step is performed under heating.

9. A highly durable refractory nozzle for casting comprising, based on the total weight of said refractory in each case, 5–80% by weight of refractory component including the principal mineral phase consisting of mullite, baddeleyite and corundum and having the chemical composition consisting of 25–85% by weight of $Al_2O_3$, 10–70% by weight of $ZrO_2$ and 5–25% by weight of $SiO_2$, respectively, based on the total weight of said chemical composition and 10–40% by weight of carbon powder.

10. A process for producing a highly durable refractory nozzle for casting comprising the steps of admixing, based on the total weight of said refractory in each case, 5–80% by weight of refractory component including the principal mineral phase consisting of mullite, baddeleyite and corundum and having the chemical composition consisting of 25–85% by weight of $Al_2O_3$, 10–70% by weight of $ZrO_2$ and 5–25% by weight of $SiO_2$, respectively, based on the total weight of said chemical composition, 10–40% by weight of carbon powder, up to 20% by weight of one or more members selected from the group consisting of SiC, $Si_3N_4$, metallic silicon and ferrosilicon, up to 30% by weight of fused silica and up to 60% by weight of alumina powder containing at least 70% by weight of $Al_2O_3$ based on the total weight of said alumina powder by the use of a binder, moulding said mixture and burning the resulting moulded product in non-oxidation environment.

* * * * *